（12) United States Patent
Barker et al.

(10) Patent No.: US 10,957,496 B2
(45) Date of Patent: Mar. 23, 2021

(54) CONNECTOR

(71) Applicant: CORDSAFE LTD, Dorset (GB)

(72) Inventors: John Christopher Holroyd Barker, Dorset (GB); Benjamin Metcalfe, Dorset (GB); Allan Caple, Dorset (GB)

( * ) Notice: Subject to any disclaimer, the term of this patent is extended or adjusted under 35 U.S.C. 154(b) by 0 days.

(21) Appl. No.: 16/348,557

(22) PCT Filed: Nov. 9, 2017

(86) PCT No.: PCT/GB2017/000164
§ 371 (c)(1),
(2) Date: May 9, 2019

(87) PCT Pub. No.: WO2018/087509
PCT Pub. Date: May 17, 2018

(65) Prior Publication Data
US 2019/0287740 A1   Sep. 19, 2019

(30) Foreign Application Priority Data

Nov. 10, 2016   (GB) .................................... 1619027
Jul. 11, 2017   (GB) .................................... 1711172

(51) Int. Cl.
*H01H 3/02*   (2006.01)
*A63B 71/00*   (2006.01)
(Continued)

(52) U.S. Cl.
CPC ....... *H01H 3/0226* (2013.01); *A63B 71/0054* (2013.01); *B60K 28/04* (2013.01);
(Continued)

(58) Field of Classification Search
CPC .... H01H 3/0226; B63B 32/70; A63B 71/0054
(Continued)

(56) References Cited

U.S. PATENT DOCUMENTS 3,714,644 A    1/1973   Hellstrom
4,771,148 A *  9/1988   Bersonnet ................ H01H 3/20
                                                200/61.58 R
(Continued)

FOREIGN PATENT DOCUMENTS

GB       2530121 A      3/2016
WO    2004025059 A1     3/2004
WO    WO2004/025059  *  3/2004   ............ E05C 17/36

OTHER PUBLICATIONS

International Search Report dated Mar. 2, 2018, for International Patent Application No. PCT/GB2017/000164.

*Primary Examiner* — Edwin A. Leon
*Assistant Examiner* — Iman Malakooti
(74) *Attorney, Agent, or Firm* — Karceski IP Law, PLLC

(57) ABSTRACT

A connector includes a male, key-like member that is operably received in a female connector body. The key-like member includes a stem for operative association with a cord or other body and a distal element. The female connector has a body defining a proximal portion for operative association with a cord or other body and a slot extending along a surface of the body to an aperture for receiving a distal element of a first connector element. A first inside channel extends from the slot at a distal end of the connector to a depth from the surface of the slot. A second inside channel extends from the aperture to the first channel. One of the first and second connectors is provided with a sensor. The sensor indicates that the first connector element is located at the distal portion of the inside channel.

20 Claims, 7 Drawing Sheets

(51) Int. Cl.
*B60K 28/04* (2006.01)
*B63B 21/00* (2006.01)
*B63C 9/00* (2006.01)
*G08B 7/06* (2006.01)
*G08B 21/18* (2006.01)
*H01H 27/00* (2006.01)
*H01R 13/70* (2006.01)
*B63B 32/70* (2020.01)

(52) U.S. Cl.
CPC .............. *B63B 21/00* (2013.01); *B63B 32/70* (2020.02); *B63C 9/0005* (2013.01); *G08B 7/06* (2013.01); *G08B 21/18* (2013.01); *H01H 27/00* (2013.01); *H01R 13/701* (2013.01)

(58) Field of Classification Search
USPC ....................................................... 200/61.9
See application file for complete search history.

(56) References Cited

U.S. PATENT DOCUMENTS

| | | |
|---|---|---|
| 6,049,276 A | 4/2000 | Agozzino |
| 6,352,045 B1 | 3/2002 | Takashima |
| 2017/0221657 A1* | 8/2017 | Barker .................... G08B 7/06 |
| 2018/0140903 A1* | 5/2018 | Poure ................ A63B 24/0062 |

* cited by examiner

CONNECTOR

CROSS-REFERENCE TO RELATED APPLICATION(S)

This is a National Stage Entry into the United States Patent and Trademark Office from International PCT Patent Application No. PCT/GB2017/000164, having an international filing date of Nov. 9, 2017, which claims priority to United Kingdom Patent Application No. GB 1619027.4, filed on Nov. 10, 2016, and to United Kingdom Patent Application No. GB 1711172.5, filed on Jul. 11, 2017, the entire contents of all of which are incorporated herein by reference.

FIELD OF THE INVENTION

The present invention relates to a mechanical connector for fasteners associated with cords, belts, straps and the like. More specifically, the invention relates to a mechanical connector for the secure connection of two components, with a sensor or switch such as an electrical switch operable to confirm association whereby, for example, to enable performance of a function in a system.

BACKGROUND OF THE INVENTION

Motor boat personnel have been known to fall overboard from a boat, from time to time. In the case of the pilot of a motor boat, especially a lone pilot, it has been known for the boat to continue its operation without an operator. Further, such runaway boats have been known to seriously injure the operator of the boat in the water since a runaway boat tends to circle back to the place where the operator has fallen overboard. Such injuries are normally caused by the propeller of the boat cutting the operator in the water or by the boat itself ramming the operator in the water.

Kill-switch systems have been developed so as to prevent movement of a vehicle once the kill-switch has been activated. A kill-switch is typically located on the control or instrument panel of a boat and comprises a movable spring-loaded part which must be held in a certain position for the boat to run. The kill-switch key must be distinguished from a key used to operate a boat—or other motorised personal vehicle generally, since the key is operable to enable the vehicle to move and so, in one sense, could disengage a drive shaft, for example, although typically disables the ignition such that the engine is killed. Should the operator fall overboard, the lanyard would become taut and would subsequently pull the latch-key from the switch, breaking the electric circuit of the engine ignition system, turning off or "killing" the engine.

In U.S. Pat. No. 6,352,045 (Yamaha), a kill-switch and engine control system is shown for a jet-ski. Presently, there is no legal requirement for a kill-cord to be fitted to any kind of boat in the Recreational Craft Directive (RCD), which is the safety standard to which all boats in the EU have to conform. There is however a section in the Inland Waters Small Passenger Boat Code which states that, "All inflatable boats, those fitted with buoyant collar and open boats able to achieve planing speed, should, if they have remote throttle controls, be fitted with a kill-cord, which must be used at all times". Nonetheless, despite the lack of specific boatbuilding legislation, most outboard engine manufacturers do supply a kill-cord system with every engine sold and most manufacturers of sports boats and RIBs powered by inboard engines choose to fit them. Equally, whilst there is no legal obligation for leisure boat owners to wear a kill-cord, if it is fitted to a boat, there may be a clause in an insurance policy which mandates the correct use of a kill-cord. Furthermore, commercial operators are typically governed by a code of practice which requires the use of a kill-cord when fitted. Yet full compliance is rare, as witnessed by the numbers of accidents that, nonetheless still occur. United Kingdom Patent No. GB 2 530 121 B (Cordsafe) provides a tethered kill-switch arrangement for a motorised device, wherein operation of the motor wherein the arrangement further comprises an alarm element which alarm element operates in the event that the pilot clip has not been properly associated with the pilot.

Lanyard operated/corded control kill switch systems are known in other fields. It will be appreciated that maintenance personnel operating with scissor-lift, powerful machinery and the like need to be in control of their equipment when the equipment is functioning.

On the one hand a mechanical fastener is required to ensure correct association of two components, whereby an electric circuit (or optical or other type of circuit) is closed. On the other hand, the mechanical fastener is required to be rugged in potentially extreme outdoor environments, for example, being subject to wide variations in temperature, including freezing conditions—and will need to be resistant to mishandling and inevitable exposure to rain, salt-spray, oils, industrial fluids, cleaning fluids etc. such that the performance of the electrical circuitry and the performance of the fastener is not diminished. Similar systems can be utilised in a great number of areas, especially where matters of safety are involved, where a material conditional result is provided to ensure that not only is a safety item being provided but also that the safety item is being deployed correctly.

OBJECT OF THE INVENTION

The present invention seeks to provide a solution to the problems addressed above. The present invention seeks to provide an improved fastener or connector. The present invention also seeks to provide an improved fastener for use with a security device such as a kill-cord device. The present invention also seeks to provide an improved fastener or connector with a switch for an alarm, tool control, motor control or similar.

STATEMENT OF INVENTION

In accordance with a general aspect of the invention, there is provided a connector comprising first and second connector elements, respectively being a male, key-like member which is operably received in a female connector body, wherein: the key-like member includes a stem having a length L, for operative association with a cord or other body and a distal element having a width $w'$; the female connector comprises a body defining a proximal portion for operative association with a cord or other body, the body defining a slot, of width $w$, extending along a surface of the body from a distal end of the female connector body opposite the proximal portion, to an aperture for receiving a distal element of a first connector element, wherein $w'>w$; a first inside channel extending from the slot at a distal end of the connector having a width $W$, wherein $W>w'$, the first channel extending a depth $d$ from the surface of the slot; a second inside channel extending from the aperture to the first channel having a width $W'$, wherein $W'>w'$; wherein one of the first and second connectors is provided with a sensor;

wherein the first connector element can be introduced via the aperture into the second channel and moved to the distal portion of the inside channel, such that the sensor can indicate that the first connector element is located at the distal portion of the inside channel. Conveniently the width of the aperture is the same as the width of the inside channel.

The aperture in the body of the second connector can conveniently be provided with a profile and the distal end of the first connector can be provided with a complementary profile. Conveniently, one of said first and second connector members is associated with a cable. Alternatively, each of said first and second connector members is associated with a cable. One of said first and second connector members can be associated with a fixed body associated with a vehicle/machine or other third party element. The contacting faces for the inside distal surface of the internal channel and the distal part of the first connector can be correspondingly curved in one orientation. Alternatively, the contacting faces for the inside distal surface of the internal channel and the distal part of the first connector are correspondingly spherical.

The distal part of the first connector member can be substantially spherical and the cross section of the inside channel can be correspondingly substantially circular. In an alternative, the distal part of the first connector member can be substantially ovoid and the cross section of the inside channel can be substantially oval. The second inside channel is preferably arranged substantially perpendicular to an axis of the first inside channel. Alternatively, the second inside channel is arranged within an angular range of +45° to −45° with respect to an axis of the first inside channel.

In a preferred version of the connector the distal portion of the first connector element can be biased into a correct position within the inside channel by biasing elements, such as oppositely polarized magnet elements associated with the separate connector elements, whereby the magnet portions are attracted to each other. In an alternative, similarly polarized magnetic elements, when positioned relative one to another can be employed to repel the first connector into position in the inside channel of the second connector. In the alternative the biasing elements the biasing elements comprise, elastomeric members associated with one or more connector members.

The sensor can use utilises an electromagnetic effect to indicate that the first connector element is located at the distal portion of the inside channel. For example, a magnet associated with one connector element can control a reed switch associated with the other connector element whereby to enable a current to pass through the reed switch whereby to indicate that the first connector element is located at the distal portion of the inside channel. The system could be arranged so that an opposite effect was realized. First and second optical fibres could alternatively be employed to transmit light from a light source and to return light to a receiver, whereby a break in the light bridge is indicative of the first element being received at the desired place within the inside channel. Any reflective properties of the male connector could also be employed whereby light transmitted by fibre is returned after reflection from the reflective distal end of the first connector element.

Conveniently, the switch assembly is associated with an alarm or a motor of a piece of motorized equipment or a vehicle such the motor does not operate when the connector members are not operably associated with respect to each other. Alternatively, the switch assembly is associated with an output of a motor of a piece of motorized equipment or a motor of a vehicle such the motor cannot enable operation/movement of the piece of equipment or propulsion of the vehicle to occur when the connector members are not operably associated with respect to each other. Notwithstanding this, there can be provision within such a system, for a grace period of, say five—ten seconds to allow for a transfer in responsibility of operation from a first pilot to a second pilot.

The or each alarm element can comprise any one or more of a number of elements such as a warning buzzer, siren or other sound generating system, a warning light, such as a strobe light—bearing in mind that many builders vehicles, cranes, scissor lifts and the like and recreational vehicles such as speed-boats are often more likely to be employed in a noisy environment and need to be suitably loud or, conversely, when the sun is very bright and need to be suitably eye—catching. Other alarm indicators can be employed, such as a vibratory device for placement in a pocket etc. in a manner similar to those presently employed by mobile phones. An alarm element can be associated with the connector assembly or the machine or vehicle to which one of the components is ultimately attached. The invention also provides a connector, wherein the aperture in the body of the second connector has a profile and the distal end of the first connector has a complementary profile. The first and second connector bodies have respect axes, which axes, in use, are not necessarily coincidental. A light bridge can be formed in the female connector, having first and second optical fibres to transmit light from a light source and to return light to a receiver, whereby a break in the light bridge is indicative of the first element being received at the desired place within the inside channel. Alternatively, a light bridge can be formed in the female connector, having first and second optical fibres to transmit light from a light source and to return light to a receiver, whereby a continuity in the light bridge upon reflection from the distal part of the first connector is indicative of the first element being received at the desired place within the inside channel.

In the case of a boat, the alarm element may be associated with an outboard motor, an inboard motor, in an area about a tiller or steering wheel of a pilot console, or in one of multiple positions of a boat where control of the boat is possible and be easily enabled, for example, by an outboard motor and a pilot console or by a pilot console on the first deck and by a pilot console on a fly-bridge.

The machine can be selected from the group including (without limitation) a power tool, a scissor-lift, construction industry plant—and other types of plant machinery (The term 'plant' refers to machinery, equipment and apparatus used for an industrial activity; typically, in construction, 'plant' refers to heavy machinery and used during construction works, such as a crane), a lathe, milling machine, an agricultural power tool, a garden power tool, running machine and gym equipment. In the case of tools that are employed for work purposes, the duration of use could be monitored, with a controller storing data for download and/or wireless transmission for use by employers to address time management concerns and to address health and safety issues, especially relating to time at work in potentially dangerous situations. The motorised vehicle can be selected from the group comprising motor boat such as a dinghy, RIB, sports boat (speedboat), cabin cruiser, etc., jet-ski, golf buggy, motorcycle, lawn-mower and tractor. In accordance with another aspect of the invention, there is provided a kill-switch arrangement for use in such motorised vehicles.

The first and second connector members can be made from a variety of non-ferromagnetic materials, such as injection moulded thermo plastics, including engineering polymers, many of which can be overmoulded to provide indicia and other effects; it is advantageous to use UV-resistant plastics given the outside use of many safety devices that can employ the present connector. The connector can be provided as a package with an alarm operably controlled by the connector and may be provided with non-rechargeable or rechargeable electrical cells. The alarm may provide audible, visual, electrical signals or a combination of such. The assembly can be provided with an induced current charging system as part of the arrangement, whereby a support cradle for the charger can assist in maintaining the equipment in a central place, conveniently close to the controls of the vehicle.

BRIEF DESCRIPTION OF THE FIGURES

For a better understanding of the present invention, reference will now be made, by way of example only, to the Figures as shown in the accompanying drawing sheets, wherein.

DETAILED DESCRIPTION OF PREFERRED EMBODIMENT

There will now be described, by way of example only, the best mode contemplated by the inventor for carrying out the present invention. In the following description, numerous specific details are set out in order to provide a complete understanding to the present invention. It will be apparent to those skilled in the art, that the present invention may be put into practice with variations of the specific.

Figure 1:
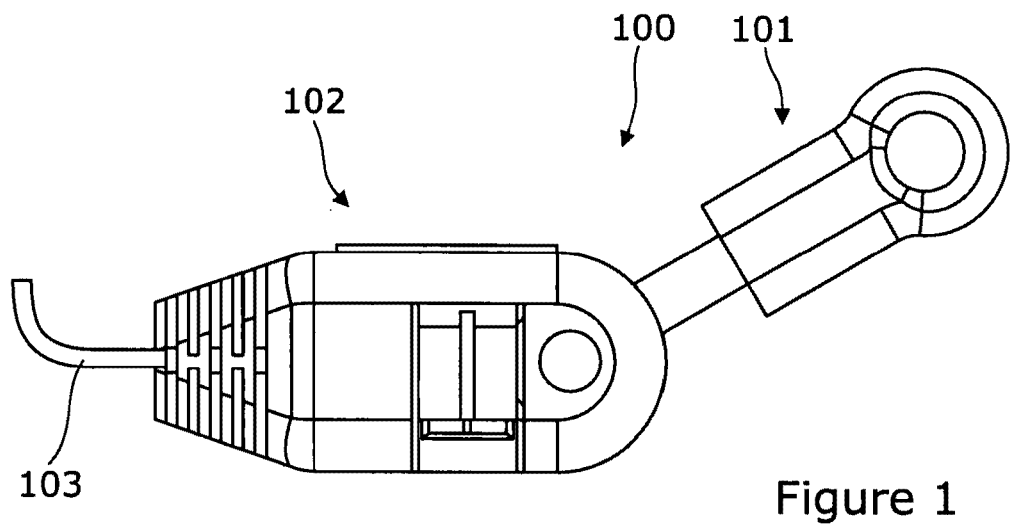
FIG. 1 shows a plan view of a first embodiment of the invention.

Referring to FIG. 1, there is shown a first embodiment of a connector 100 in accordance with the invention, in a view from one side, comprising first and second connector elements, 101, 102, respectively being a male, key-like member 101 which is received in female connector body 102. A cable end 103 is shown associated with the connector 102, at a proximal portion or cable entry portion 104 of the connector body for connection to a machine, boat or other type of device or system.

Figure 2:
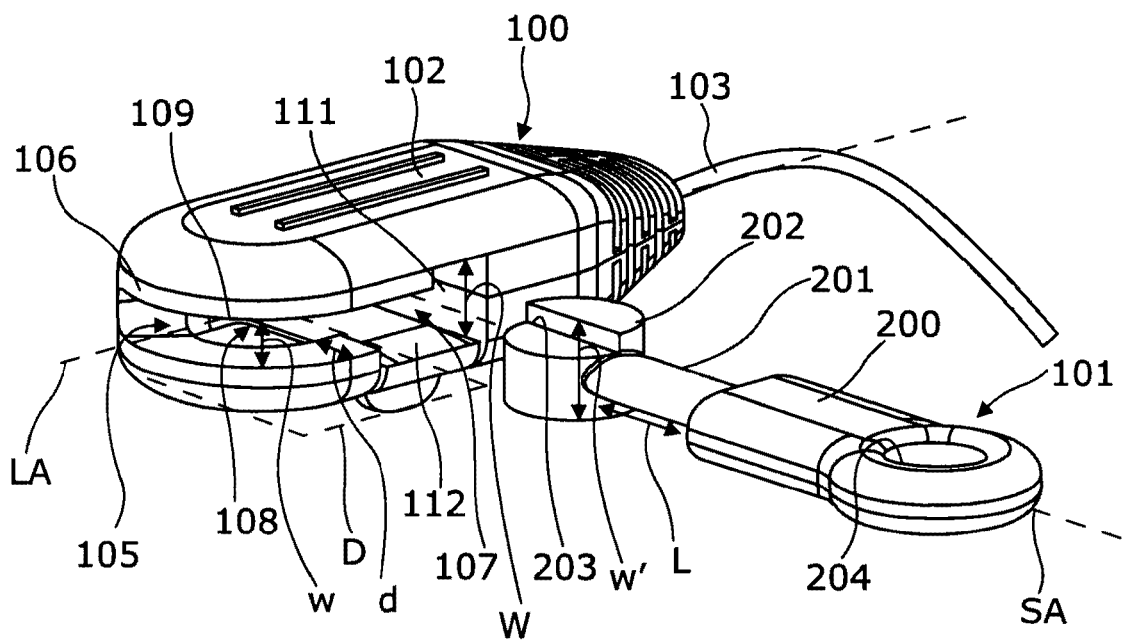
FIG. 2 shows a perspective view of the $1^{st}$ and $2^{nd}$ members.

FIG. 2 shows a perspective view of the connector 102 exposing in detail a slot 105 extending from a distal end 106 of the female connector body opposite the proximal portion 104. The first member is arranged such that it is about to be inserted into the second connector member. The slot comprises an internal passage 108 having a width W, with a peripheral portion extending from the entry portion 107 to the distal end 106, the peripheral portion of the slot 109 having a width w, which width w is less than the width W of the internal channel 108 and has a depth d. The internal passage 108 generally defines a longitudinal axis LA extending from the proximal portion to the distal portion with an entry portion 107 therebetween to enable the first key-like member 101 to be inserted into the entry portion 107, the entry portion having a subsidiary axis SA distinct from the longitudinal axis, the subsidiary axis preferably being arranged between +45° and −45° to the longitudinal axis and conveniently being arranged at 90° to the longitudinal axis.

The key-like member 101 comprises a handle 200, a stem 201 having a length L, which length L is less than the depth d of the peripheral portion of the slot, terminating with a distal element 202 having a width w' which is less than the width of the channel W, but greater than the width w of the peripheral portion of the slot. Upon insertion of the male member 101, the distal end 202 thereof is received within entry portion 107; upon being sufficiently inserted, i.e. such that at least a length of stem corresponding to the distance d, the distal element can slide within the channel. Conveniently, the distal member is handed in that on one side 203, the side is generally flat; on the other side, the side has a stepped surface 204, meaning that there is an orientation to the key, whereby when magnetic elements are associated with the distal end, for example, the distinction between magnetic attraction and magnetic repulsion in a magneto-sensitive switch arrangement, can be determined. The distal end of the first connector is shown as having a general barrel-shape, but it is no restricted to such a shape. Indeed, whilst there could be provided a general arcuate distal surface for the key member, it would be more accurate to confirm that there must be sufficient space to enable the key element to be rotated through approximately 90° (or whatever the insertion angle may be) from its insertion approach to lie, generally coaxially with the longitudinal axis of the inside channel.

The distal aperture of the second element is conveniently shaped to allow movement of the first element in an angular range of say 40° to enable the first and second connector elements to lie about another surface, if necessary—for example when employed about a leg or other body part when used with respect to a motorboat kill-cord system. In the event that the distal element 202 had a part spherical or mushroom-like surface facing the stem 201 and the inside of the distal face of the internal channel 108 was generally correspondingly spherical, but with a larger angular range, then the first element would be able to move within a conic range, the angular range of movement of the plane perpendicular to the plane of the two body parts 102a and 102b.

Figure 2A:
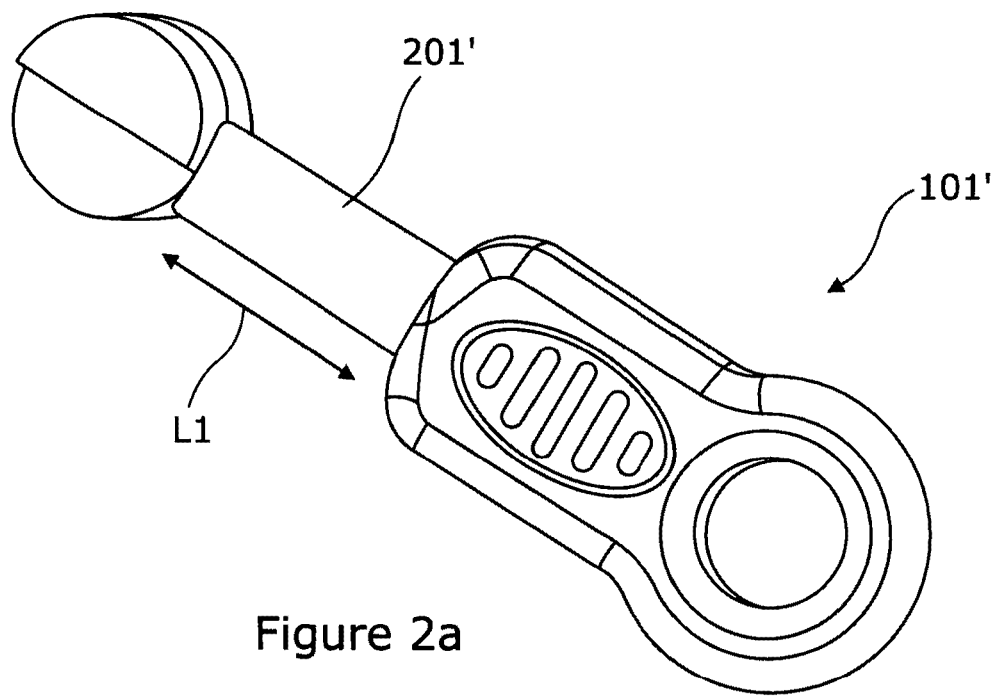
FIGS. 2a and 2b show variant of the first members.
Figure 2B:
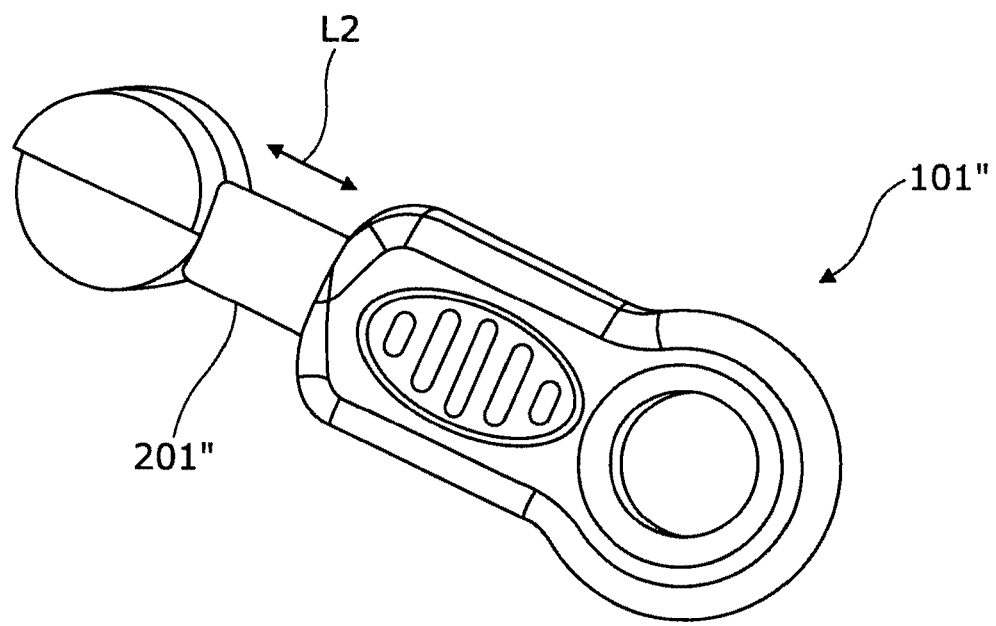

FIG. 2a shows a further first member 101', for general use, with more sculpted features, to assist in a general comfort of use. Stem 201" has a length L1, which length L1 is less than the depth D as indicated in FIG. 2, but greater than the distance d being the thickness of the sidewall of the slot. FIG. 2b shows a still further variant first member 101" with a reduced length L2 for stem 201"', whereby the further variant is more compact, for association with a life jacket, for example, wherein a freedom of movement between the two connector components is reduced. Again, length L2 is less than the depth D as indicated in FIG. 2, but greater than the distance d being the thickness of the sidewall of the slot.

Figure 3:
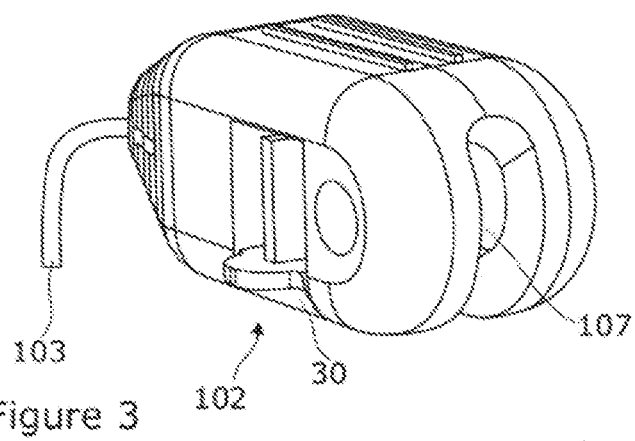
FIGS. 3, 4 & 5 show perspective views and a plan views from below of the first embodiment.

FIG. 3 shows a further view of the female connector body wherein there is detailed a clip 30, with a lip 31, arranged on one side of the body 102—with the wedge portion 111 on an inside face (see FIG. 2) of the internal channel 108 can be provided whereby to ensure that the male member 101 remains within the channel, along the longitudinal axis LA. Whilst this feature is not essential for the primary effect of the invention to be effective, the benefit of having an additional mechanical catch may be useful in certain circumstances for certain applications.

Figure 4:
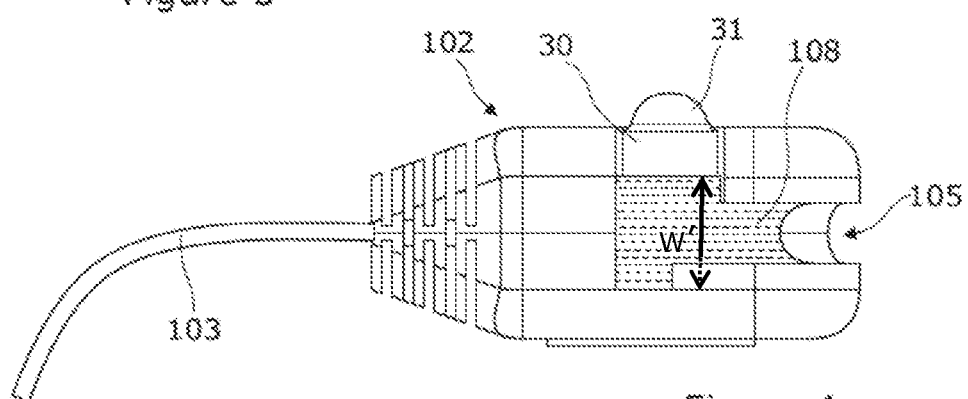
Figure 5:
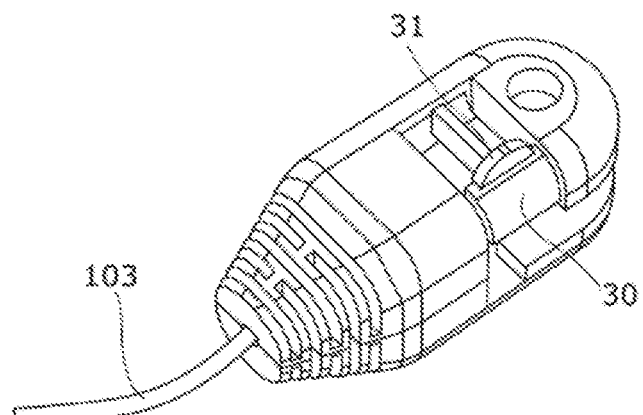
Figure 6:
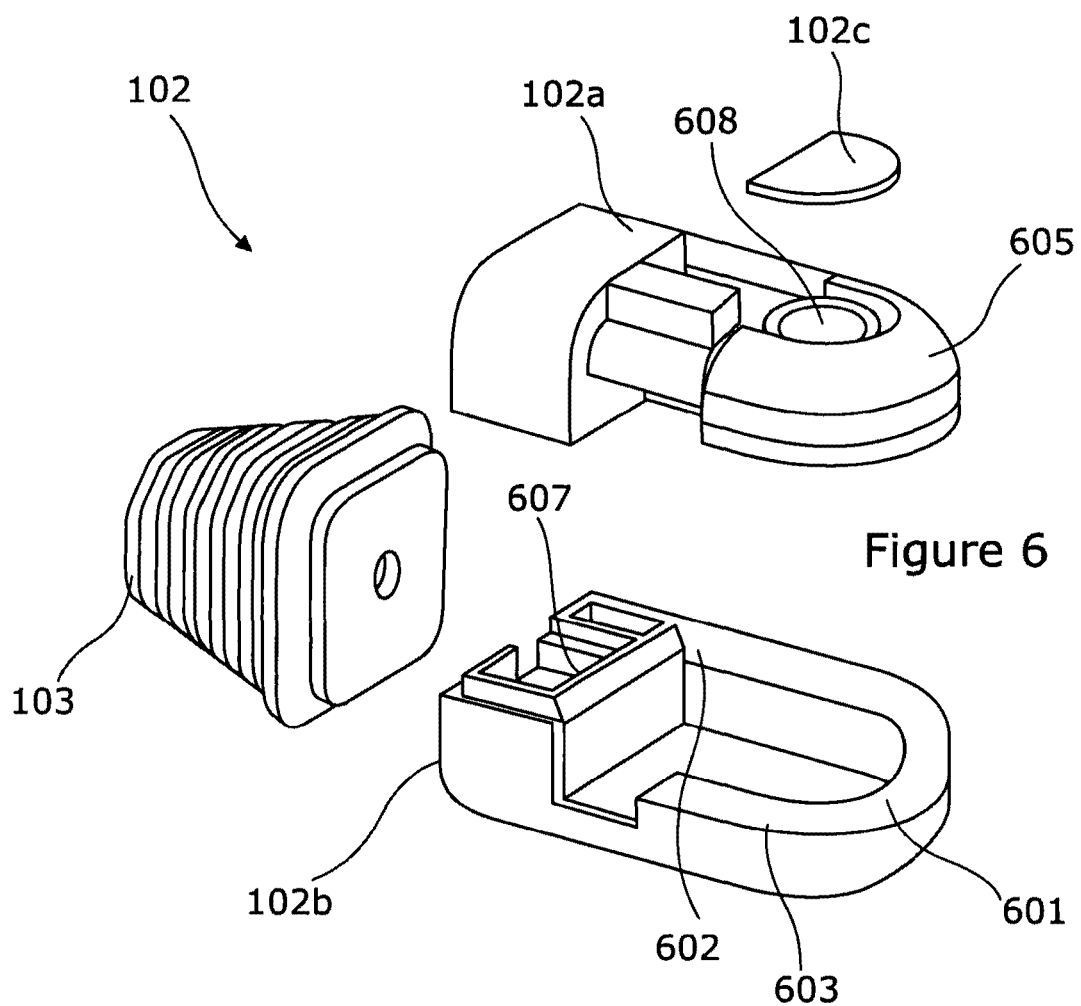
FIG. 6 shows an exploded perspective view of a second, female connector in accordance with the invention.

FIG. 4 shows a plan view of the female connector body, with the central portion showing the extent of the central channel 108, of height W', noting that the peripheral portion obscures the width of the channel over the extent of the longitudinal axis LA. FIG. 5 show the female connector in perspective view, clearly showing clip 30 and its associated lip 32. As will be appreciated, the first and second connector members can be made from a variety of non-ferromagnetic materials, such as injection moulded thermo plastics, including engineering polymers, many of which can be overmoulded to provide indicia for example as well as functional and purely decorative effects; it is advantageous to use UV-resistant plastics given the outside use of many safety devices that can employ the present connector. Glues can be employed to attach component parts together, whereby to ensure a degree of waterproofing, for example, although the use of screws or similar removable fastenings can assist in servicing. Stainless steels can be employed. Carbon fibre mouldings can be employed, where weight issues are a concern, although, a carbon fibre look can be utilised to imbue a sense of quality and/or a sense that the system is technologically advanced in the finished product.

A connector in accordance with the present invention could be provided with an external switch and or indicator whereby a test of the sensor could be provided. Equally a flashing light could always operate when the system is fully functioning whereby to enable easy location at times of low light. An audible indicator could be provided to allow a test to be performed. An audible alarm could also be associated with the connector, although when associated with a machine, vehicle or similar, an alarm associated with the respective machine, vehicle etc. is more likely to be acted upon. Given that the connector can be used by employees in the performance of their duty, for example, in a scissor lift inspecting road furniture—or any one of the numerous above-ground installation, maintenance and cleaning tasks associated with constructions, electrical power, facilities management, glazing, heating, ventilating & air conditioning and warehousing—health and safety management codes can be monitored as well as allowing time and motion studies to be performed to assist in the most effective deployment of equipment and resources. Accordingly, the alarm system can also be provided with a time of use recorder whereby to enable such analyses to be performed.

Figure 7:
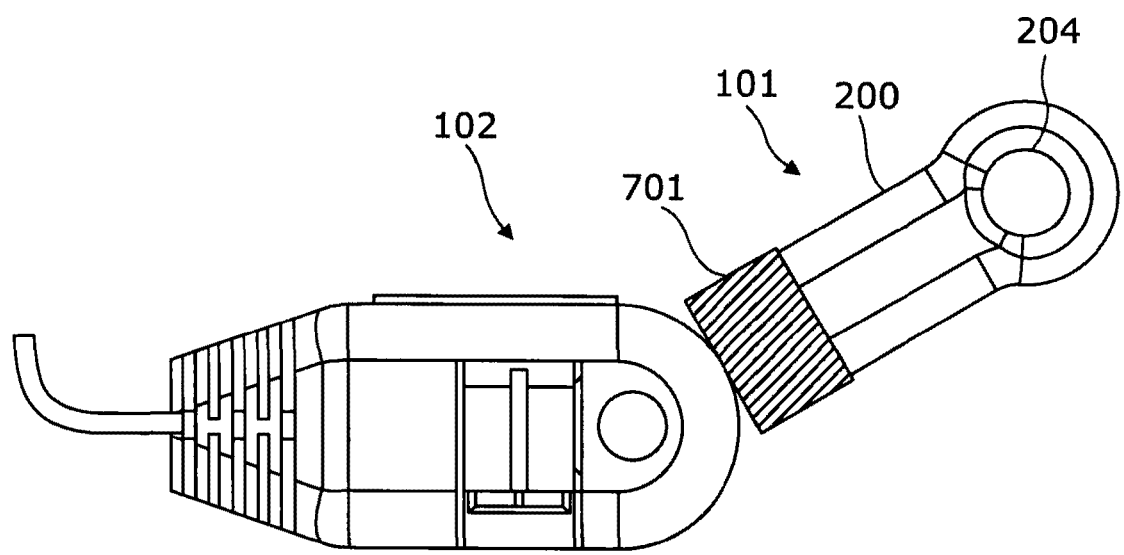
FIG. 7 shows a side view of a variation of the first embodiment of the invention.

FIG. 7 shows an alternative embodiment, wherein a resilient body 701 surrounds the stem 201 of the first connector member, which resilient member acts upon an external part of the distal section of the body of the second connector 102 whereby to resiliently bias the distal element 202 of the key adjacent a distal surface of inside channel 108 whereby to enable a reed switch to be actuated, an electro-optic circuit or similar to be actuated. Resilient body 701 could comprise a resilient member such as a metallic helical spring element—conveniently enshrouded in a protective material or a polymeric resilient member, for example, but the skilled man would be capable of employing many types of material to perform this function. By the use of such a resilient body, the connector system can be manufactured in a relatively simple fashion.

Figure 8:
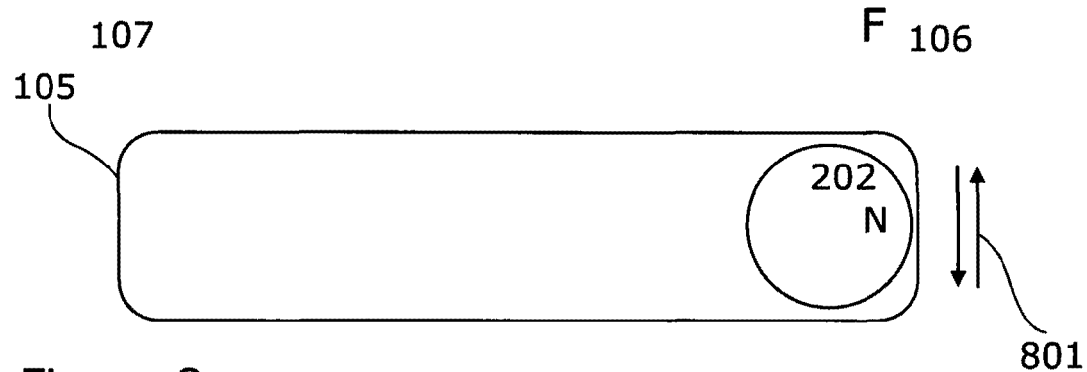
FIGS. 8-13 provide simplistic views of a number of possible configurations of operation.
Figure 9:
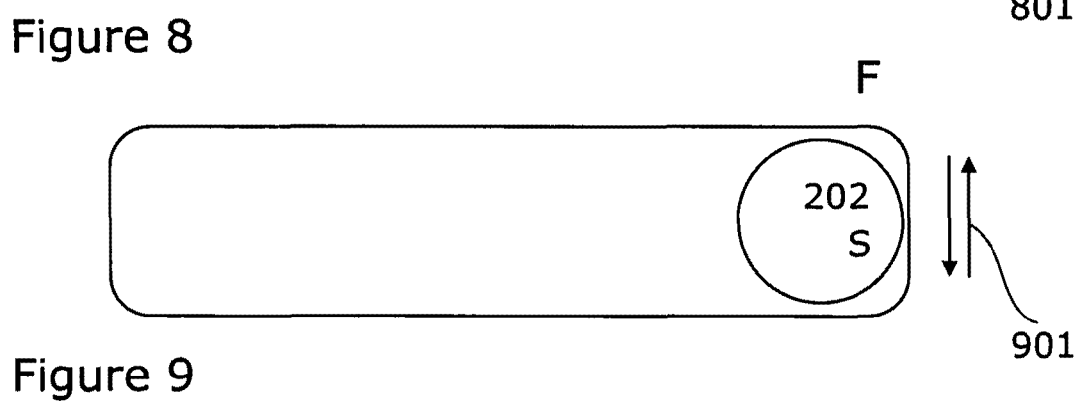

FIG. 8 shows a first simplistic view with regards to a scenario of operation. The distal member 202 of the male element 101 is placed within the internal channel 105 of the female member 102. In this situation the "North Pole" of the distal element is adjacent a ferromagnetic element F arranged within an otherwise non ferromagnetic connector member 102. In this instance, not only is the distal member 202 attracted to the end of the channel 108—by means of the ferromagnetic element F—but reed switch 801 is caused to close in view of the presence of the magnetic field. Reed switches are well known in the art and comprise an electrical switch operated by an applied magnetic field. Reed switches can simply comprise a pair of contacts on ferrous metal reeds in a hermetically sealed glass envelope. The contacts may be normally open, closing when a magnetic field is present, or normally closed and opening when a magnetic field is applied. The switch may be actuated by a coil, making a reed relay, or by bringing a magnet near to the switch. Once the magnet is pulled away from the switch, the reed switch will go back to its original position. In contrast, the next figure—FIG. 9—there is shown a similar arrangement except that the magnetic reed switch 901 is in an open circuit mode. It will be appreciated that since the ferromagnetic element is not polarized, it is immaterial as to whether the distal member 202 of the male element 101 is either "North Pole" or "South Pole" polarized, although this will have a bearing upon the associated reed switch 801, 901.

Figure 10:
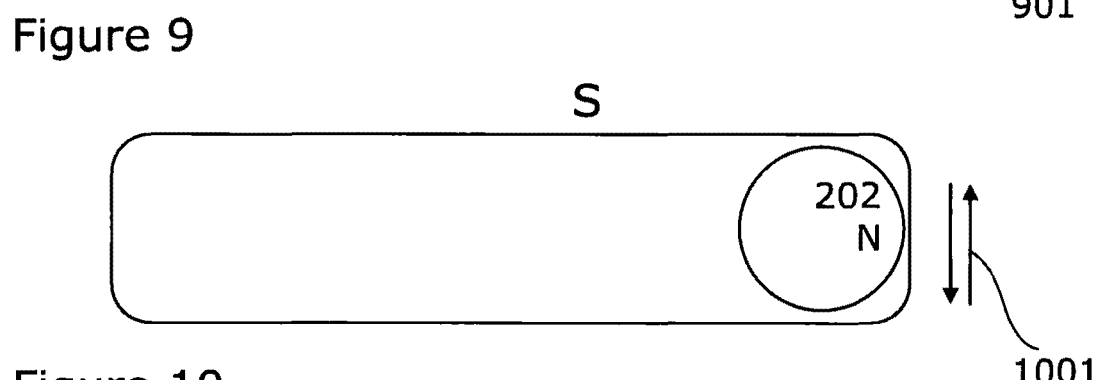
Figure 11:
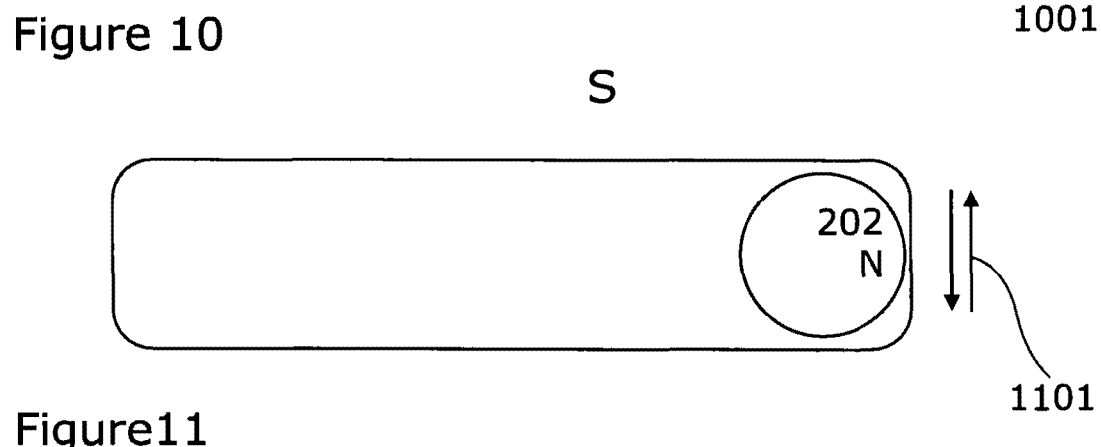

FIG. 10 shows a third simplistic view with regards to a scenario of operation. The distal member 202 of the male element 101 is placed within the internal channel 105 of the female member 102. In this situation the "North Pole" of the distal element is axially distal a magnetic element arranged so as to present a "South Pole" with respect to a "South Pole" of the distal member 202, urging the distal member towards the distal end of the channel 106. Given that the "North Pole" is distal to the "South Pole" element S arranged within the connector member 102. In this instance, not only is the distal member 202 attracted to the end of the channel 108—by means of the magnetic element S—but reed switch 1001 is caused to close in view of the presence of the magnetic field. In contrast, in FIG. 11, there is shown a similar arrangement except that the magnetic reed switch 1101 is in an open circuit mode, given a different mode of operation of the reed switch (open circuit in the presence of a "North Pole" magnetic field.

Figure 12:
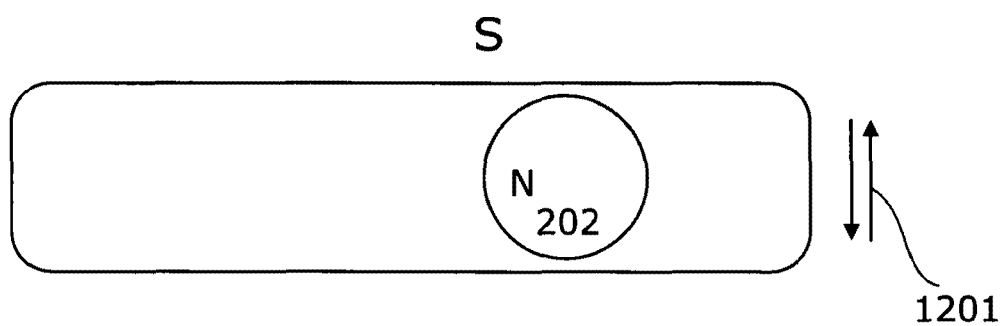
Figure 13:
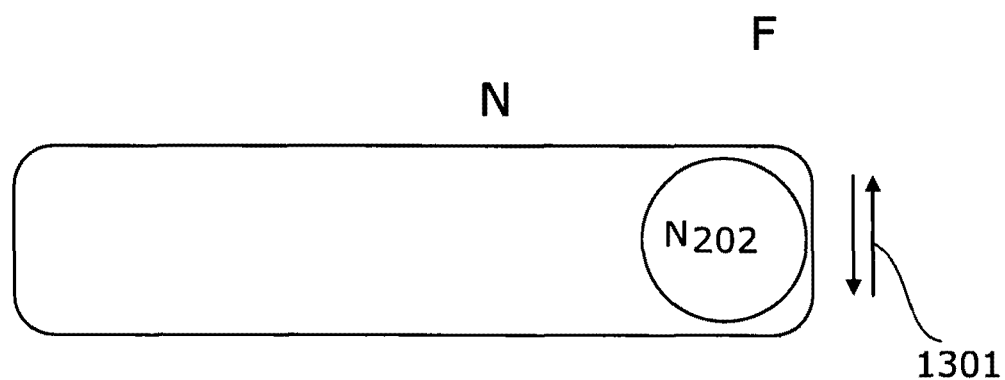

FIG. 12 shows a fifth simplistic view with regards to a scenario of operation. The distal member 202 of the male element 101 is placed within the internal channel 105 of the female member 102. In this situation the "North Pole" of the distal element is axially adjacent a corresponding magnetic element arranged so as to present a "South Pole" with respect to the distal member 202. Given that the "North Pole" is attracted to the "South Pole" element S arranged within the connector member 102, the rest state is one of being in close proximity. In this instance, not only is the distal member 202 attracted to the middle of the channel 108—by means of the magnetic element S—but reed switch 1201 is caused to close in view of the absence of a magnetic field. In contrast, in the next figure—FIG. 13—there is shown a similar arrangement except that the pole of the female connector is reversed and magnetic reed switch 1301 is in an open circuit mode, given the different mode of operation of the reed switch, noting that in this orientation, the distal element of the first connector has been urged against distal end of the inside channel, due to the mutual repulsion of the similar poles. In this instance, in order that the reed switch 1301 is open, the distal element of the first connector must be in the position shown.

By having the reed switch appropriately configured, it will be realised that the connector can be arranged so as to provide a closed circuit when the insert member is a desired position. Equally, it is possible to arrange the configuration such that magnetic attraction between connector elements causes an open circuit and therefore the male member must be arranged such that it is brought toward a distal end of the connector housing to enable the circuit to close. It will also be appreciated that the present invention can provide a simple, easily configured connector system. By the use of simple data recording devices, periods of use can be determined whereby to assist in compliance with health and safety issues amongst other matters. In order for this to happen, an associated control system can log hourly usage simply by determining on/off periods of electrical circuit, fibre-optic circuit or other system, as appropriate. Data stored could be transferred by wireless transfer for example.

Figure 14:
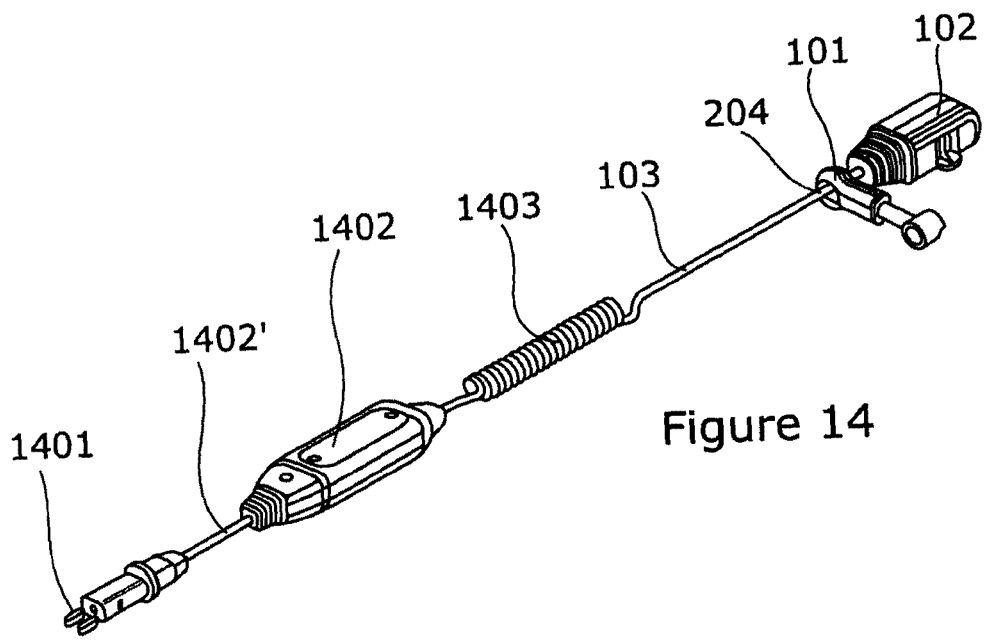
FIG. 14 shows a kill-cord system comprising a connector in accordance with the present invention.
Figure 15:
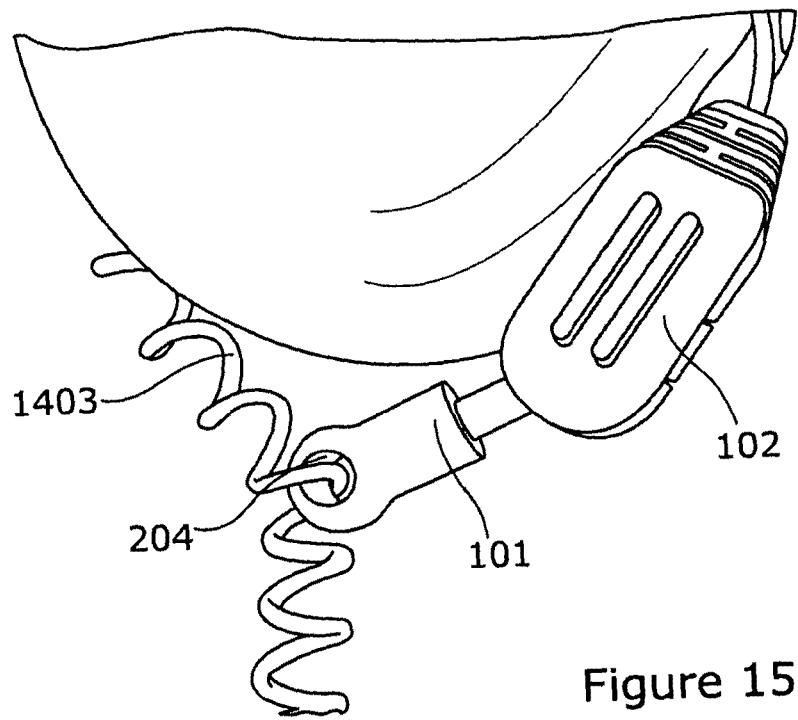
FIG. 15 shows an embodiment of the invention about a leg of a pilot.

Referring now to FIG. 14, there is shown a kill-cord system, comprising a kill-cord key element 1401, which is operably inserted to a corresponding receiving control switch, conveniently located by a tiller on a motor boat or associated with an outboard motor on a dinghy and arranged to separate upon being yanked out, for example if a person wearing a kill-cord, i.e. a person having a leg or other body part fastened by encirclement of such body part by the coupling cord 103 and coupling assembly 100, and then that person falling overboard or moving beyond range of the tiller, fly-bridge area, etcetera. With reference to FIG. 15, coupling cord 103 is defined by a helical section which accommodates eyelet 204 of first connector element 101, whereby to provide a loop, once the first connector element has been secured within the second connector element 102. It has been found that the helical cord—which comprises a security tether together with wires to enable an electrical circuit, optical fibres or other form of alarm detection mechanism—can provide a taut loop, with a reasonable degree of resilience whereby not to interfere with the use of the leg as such. Indeed, it has also been determined that the cord can be arranged simply without a helix for 10-25 cm so that the cord can be arranged around a body part, such as a leg or arm, although for a connector of length 17 cm, when connected, it was found that the length of cord without a spiral also 17 cm enabled comfortable use of the connector arrangement. During testing, it has been found convenient to have the connector arranged with a system that emits a warning signal if the distal portion of the first connector member is not at the distal end of the internal channel. The connector was fitted with magnets arranged so that the connector assembly would be urged to move towards the alarm position if the male member was not suitably resiliently fastened around a leg of a wearer, for example, in the case of a kill-cord for a motor boat. Thus the system can assist in recognising a situation that the male connector is not resiliently urged to a position of normal use; once the cord is resiliently attached about a leg of the wearer by means of a cord then an alarm signal will not issue; i.e. the sensor will indicate that the first connector element is located at the distal portion of the inside channel. In contrast, however, with a life-jacket system as shown with reference to FIG. 2*b*, the shorter length L2 of the stem of first connector element 10 will reduce a likelihood of the two parts separating from the distal end and causing the alarm to operate, in the absence of some tension. Moreover, the part referenced 200 of the first connector member 101 (per FIG. 2) will closely abut section 106 of the second connector member 102. The shorter stem L2 will ensure that in order for the two connector members to be detached, the first connector member must be pivoted through approximately 90° at the distal end from a coaxial orientation to a perpendicular orientation to allow the two components: after bringing the first member to the centre of the second member (as indicated in FIG. 2), when it may be pulled from the second connector member in a direction corresponding to axis SA, i.e. perpendicular to the axis LA of the second member 102.

Returning to FIG. 14, the kill-cord key element 1401 is linked by a cable to a battery pack and alarm assembly 1402, which battery pack and alarm assembly provide electrical power to complete a circuit in accordance with the reed switch or, for example, to complete an optical circuit when an optical fibre is associated with the cable (as opposed to pair of electrical wires), when a LED or laser diode and optical receiver associated are provided. The alarm element is activated upon the making/breaking of an optical/electrical circuit, dependent upon how the alarm circuit is configured. The alarm itself is preferably an audible alarm, ideally an optical and audible alarm—or indeed a wireless alarm, operable to send a message to a third party. The battery pack and alarm assembly 1402 are provided as a suitable weatherproof/rugged design for the anticipated circumstances.

The connector could be provided with an external switch and or indicator whereby a test of the sensor could be provided. Equally a flashing light could always operate when the system is fully functioning whereby to enable easy location at times of low light. An audible indicator could be provided to allow test. An audible alarm could also be associated with the connector, although when associated with a machine, vehicle or similar, an alarm associated with the respective machine, vehicle etc. is more likely to be acted upon.

One of the connector members could be associated with an item of safety apparel such as a harness of a life jacket, in particular a male closure member could comprise an upstanding member of part of a buckle or other feature of the harness or lifejacket, which upstanding member could be associated with the female, second connector member, provided with a cord which leads to an alarm system. Conveniently, the first member may have a stem length of reduced dimensions or may be pivotally mounted to a base, whereby to fold away when not required. The use of a first member with a shorter shaft may prevent migration of the distal portion of the first connector member, whereby to ensure that the reed switch is appropriately oriented. Such an arrangement may allow any tension sensing arrangement to be dispensed with if, nonetheless, a clip and switch are present.

The invention provides a simple to use connector for use in a multitude of applications where a warning and, possible non-operation of a function in view of a safety-critical pilot clip, lanyard and kill-switch arrangement that is provided with a simple and robust circuitry to enable the correct use of an essential safety device, namely the kill-cord assembly and propulsion control device, whether it be a boat propeller, a rear-wheel of a motor-cross bike or otherwise separated from the vehicle, for whatever reason. When employed for marine and watercraft use in general, it is prudent to have assemblies where electric circuits are involved to be waterproofed, having seals, gaiters and rubber boots as appropriate and drain holes in areas where water may accumulate to minimise or overcome any problems that might otherwise occur with the presence of water, especially saline water.

The invention claimed is:

1. A connector comprising first and second connector elements, respectively being a male, key-like member which is operably received in a female connector body, wherein:
    the key-like member includes a stem having a length L, for operative association with a cord or other body and a distal element having a width w';
    the female connector comprises a body defining a proximal portion for operative association with the cord or other body, the body having a slot, of a width w, extending along a surface of the body from a distal end of the female connector body opposite the proximal portion, to an aperture for receiving the distal element of the first connector element, wherein w'>w;

a first inside channel extending from the slot at a distal end of the connector having a width W, wherein W>w', the first inside channel extending a depth d from the surface of the slot;

a second inside channel extending from the aperture to the first channel having a width W', wherein W'>w';

wherein one of the first and second connector elements is provided with a sensor;

wherein the first connector element can be introduced via the aperture into the second inside channel and moved to a distal portion of the first inside channel, such that the sensor can indicate that the first connector element is located at the distal portion of the first inside channel, wherein a distal portion of the first connector element is biased into a correct position within the first inside channel by biasing elements, and wherein the biasing elements comprise similarly polarized magnetic elements, which when positioned relative one to another, repel the first connector element into position in the first inside channel of the second connector element.

2. A connector according to claim 1, wherein at least one of said first and second connector elements is associated with a cable.

3. A connector according to claim 1, wherein one of said first and second connector elements is associated with a fixed body associated with a vehicle/machine/plant equipment or other third party element.

4. A connector according to claim 1, wherein contacting faces for an inside distal surface of the first inside channel and the distal portion of the first connector element are correspondingly curved in one orientation.

5. A connector according to claim 1, wherein contacting faces for the inside distal surface of the first inside channel and the distal portion of the first connector element are correspondingly spherical.

6. A connector according to claim 1, wherein the distal portion of the first connector element is substantially spherical and a cross section of the inside channel is substantially circular.

7. A connector according to claim 1, wherein the distal portion of the first connector element is substantially ovoid and a cross section of the first inside channel is substantially oval.

8. A connector according to claim 1, wherein the second inside channel is arranged substantially perpendicular to an axis of the first inside channel.

9. A connector according to claim 1, wherein the second inside channel is arranged within an angular range of +45° to −45° with respect to an axis of the first inside channel.

10. A connector according to any one of claim 1, wherein the distal portion of the first connector element is biased into a correct position within the first inside channel by biasing elements.

11. A connector according to claim 1, wherein the distal portion of the first connector element is biased into a correct position within the first inside channel by biasing elements and wherein the biasing elements comprise, elastomeric members associated with one or more of the connector elements.

12. A connector according to claim 1, wherein the sensor utilises an electromagnetic effect to indicate that the first connector element is located at the distal portion of the first inside channel.

13. A connector according to claim 1, wherein the aperture in the body of the second connector element has a profile and the distal end of the first connector element has a complementary profile.

14. A connector according to claim 1, wherein the first and second connector elements each have an axis, which axes, in use, are not necessarily coincidental.

15. A connector according to claim 1, wherein the connector is associated with a kill-cord for a machine or vehicle or industrial plant.

16. A connector according to claim 1, wherein the connector is associated with a kill-cord for a motor boat.

17. A connector comprising first and second connector elements, respectively being a male, key-like member which is operably received in a female connector body, wherein:

the key-like member includes a stem having a length L, for operative association with the cord or other body and a distal element having a width w';

the female connector comprises a body defining a proximal portion for operative association with a cord or other body, the body having a slot, of a width w, extending along a surface of the body from a distal end of the female connector body opposite the proximal portion, to an aperture for receiving the distal element of the first connector element, wherein w'>w;

a first inside channel extending from the slot at a distal end of the connector having a width W, wherein W>w', the first inside channel extending a depth d from the surface of the slot;

a second inside channel extending from the aperture to the first inside channel having a width W', wherein W'>w';

wherein one of the first and second connector elements is provided with a sensor;

wherein the first connector element can be introduced via the aperture into the second inside channel and moved to the distal portion of the first inside channel, such that the sensor can indicate that the first connector element is located at the distal portion of the first inside channel, wherein the distal portion of the first connector element is biased into a correct position within the first inside channel by biasing elements, and wherein the biasing elements comprise oppositely or similarly polarized magnetic elements, which when positioned relative one to another, repel the first connector element into position in the first inside channel of the second connector element.

18. A connector according to claim 17, wherein the connector is associated with a kill-cord for one of a motor boat, a machine or vehicle or industrial plant.

19. A connector according to claim 17, wherein the sensor utilises an electromagnetic effect to indicate that the first connector element is located at the distal portion of the first inside channel and wherein a magnet associated with one of the connector elements controls a reed switch associated with the other connector element whereby to enable a current to pass through the reed switch whereby to indicate that the first connector element is located at the distal portion of the first inside channel.

20. A connector according to claim 2, wherein the sensor utilises an electromagnetic effect to indicate that the first connector element is located at the distal portion of the first inside channel and wherein a magnet associated with one of the connector elements controls a reed switch associated with the other connector element whereby to enable a current to pass through the reed switch whereby to indicate that the first connector element is located at the distal portion of the first inside channel.

\* \* \* \* \*